(12) United States Patent
DeSanti et al.

(10) Patent No.: US 8,098,595 B2
(45) Date of Patent: Jan. 17, 2012

(54) APPARATUS AND METHOD FOR DEFINING A STATIC FIBRE CHANNEL FABRIC

(75) Inventors: Claudio DeSanti, San Jose, CA (US); Marco Di Benedetto, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 162 days.

(21) Appl. No.: 12/555,768

(22) Filed: Sep. 8, 2009

(65) Prior Publication Data

US 2009/0327518 A1 Dec. 31, 2009

Related U.S. Application Data

(63) Continuation of application No. 10/118,386, filed on Apr. 5, 2002, now Pat. No. 7,606,167.

(51) Int. Cl.
*H04L 12/28* (2006.01)
(52) U.S. Cl. ......... 370/254; 370/363; 370/368; 370/400
(58) Field of Classification Search .................. 370/254, 370/363, 368, 400
See application file for complete search history.

(56) References Cited

U.S. PATENT DOCUMENTS

| | | | | |
|---|---|---|---|---|
| 5,517,617 | A | 5/1996 | Sathaye et al. | 709/222 |
| 5,617,421 | A | 4/1997 | Chin et al. | 370/402 |
| 6,199,112 | B1 | 3/2001 | Wilson | 709/227 |
| 6,332,023 | B1 | 12/2001 | Porter et al. | 379/242 |
| 6,765,919 | B1 | 7/2004 | Banks et al. | 370/401 |
| 6,826,564 | B2 | 11/2004 | Thompson et al. | 370/4 |
| 6,976,134 | B1 | 12/2005 | Lolayekar et al. | 711/148 |
| 7,222,176 | B1 | 5/2007 | Laurent et al. | 709/226 |
| 2003/0005039 | A1* | 1/2003 | Craddock et al. | 709/203 |

FOREIGN PATENT DOCUMENTS

| | | |
|---|---|---|
| EP | 1011231 | 6/2000 |
| WO | WO 00/55750 | 9/2000 |
| WO | WO 01/14987 | 3/2001 |
| WO | WO 01/95113 | 12/2001 |

(Continued)

OTHER PUBLICATIONS

Japanese Office Action dated Feb. 6, 2009 for Application No. 2003-584923.

(Continued)

*Primary Examiner* — Hassan Kizou
*Assistant Examiner* — Toan Nguyen
(74) *Attorney, Agent, or Firm* — Weaver Austin Villeneuve and Sampson LLP

(57) ABSTRACT

A storage area network and method for defining a static Fibre Channel Fabric that does not require a Principal Switch. The storage area network comprises one or more hosts, one or more storage devices, and a static Fabric connecting the one or more hosts and storage devices. Within the static Fabric, the Switches have their Domain_ID and Fabric_Name statically set. The method comprises accessing the Fabric, selecting a Switch in the Fabric, and statically configuring the Domain_ID and Fabric_Name for the selected Switch. The above sequence is repeated for each Switch in the static Fabric. In one embodiment, after being statically configured, the Switch is isolated from any dynamically set Switches in the Fabric. The Switch detects which of its Ports are connected to dynamically set Switches, and then isolates them, while maintaining operational the Ports connected to statically configured Switches.

19 Claims, 3 Drawing Sheets

FOREIGN PATENT DOCUMENTS

WO      WO 02/25446      3/2002

OTHER PUBLICATIONS

CN Office Action dated Mar. 31, 2006 for Application No. 03807779.5.

Fibre Channel Switch Fabric-2 (FC-SW-2), NCITS working draft, Jun. 26, 2001.

Fibre Channel Generic Services-3 (FC-GS-3), NCITS working draft, Nov. 28, 2000.

US Office Action (NOA) dated May 29, 2009 for U.S. Appl. No. 10/118,386.

US Office Action dated Jul. 2, 2007 for U.S. Appl. No. 10/118,386.

US Office Action dated Nov. 24, 2008 for U.S. Appl. No. 10/118,386.

US Office Action dated Mar. 31, 2006 for U.S. Appl. No. 10/118,386.

US Office Action dated Aug. 10, 2006 for U.S. Appl. No. 10/118,386.

PCT International Search Report dated Aug. 28, 2003 issued for PCT Application No. PCT/US2003/009332.

PCT Written Opinion dated Oct. 30, 2003 issued for PCT Application No. PCT/US2003/009332.

JP Office Action mailed Nov. 2, 2009, Application No. 2003-584923.

EP Office Action mailed Nov. 4, 2010, Application No. 03746555.6.

KR Office Action dated Nov. 30, 2010, Application No. 2004-7015835.

CA Office Action mailed Mar. 3, 2011, Application No. 2,481,340.

\* cited by examiner

APPARATUS AND METHOD FOR DEFINING A STATIC FIBRE CHANNEL FABRIC

RELATED APPLICATIONS

This application is a continuation of and claims priority under section 35 U.S.C. 120 to U.S. patent application Ser. No. 10/118,386, entitled "Apparatus and Method for Defining A Static Fibre Channel Fabric", filed on Apr. 5, 2002, now U.S. Pat. No. 7,606,167, by Claudio DeSanti and Marco Di Benedetto, which is incorporated herein by reference for all purposes.

BACKGROUND OF THE INVENTION

1. Field of the Invention

The present invention relates to storage area networks, and more particularly, to an apparatus and method for defining a static Fibre Channel Fabric which does not require a Principal Switch.

2. Background of the Invention

With the increasing popularity of Internet commerce and network centric computing, businesses and other organizations are becoming more and more reliant on information. To handle all of this data, storage area networks or SANs have become very popular. A SAN typically includes a number of storage devices, a number of hosts, and a plurality of Switches arranged in a Switching Fabric. The Switches selectively connect the storage devices and the hosts within the SAN.

Most SANs rely on the Fibre Channel protocol for communication within the Fabric. For a detailed explanation of the Fibre Channel protocol and Fibre Channel Switching Fabrics, see FC-FS (Fibre Channel Framing and Signaling) and FC-SW-2 (Fibre Channel Switch Fabric-2), incorporated by reference herein for all purposes.

In Fibre Channel, each device (hosts, storage devices and Switches) is identified by an unique eight (8) byte wide Node_Name assigned by the manufacturer. When the Fibre Channel devices are interconnected to form a SAN, the Node_Name (together with other parameters) is used to identify each device. Fibre Channel frames are used for communication among the devices in the SAN. The Node_Name, however, is not used by the frames. Instead the Fibre Channel Port of each end device (hosts and storage devices) is addressed via a three (3) byte Fibre Channel address (or FC_ID), allocated dynamically to the end devices by the Fabric. Each end device acquires its FC_ID by performing a Fabric Login procedure with the Switching Fabric. In this procedure, the end device and the Fabric exchange their credentials and the operating parameters required for a successful communication across the SAN. Initially the Fabric identifies itself by an unique Fabric_Name and the end device by its unique Node_Name. Thereafter the Fabric assigns the FC_IDs to the Ports of the end devices.

The three byte wide Fibre Channel addresses are hierarchically structured in three fields, each one byte long: Domain_ID, Area_ID, and Port_ID. Each Switch within the Fabric is assigned a Domain_ID. The end devices attached to a particular Switch are assigned the Domain_ID of that Switch. The Switch manages the allocation of the Area_ID and Port_ID fields for each end device to guarantee the uniqueness of the assigned addresses in that Domain. For example, if a Switch is assigned a Domain number five and the Switch subdivides its address space in two areas each having three connected end devices, then a possible Fibre Channel address allocation is: 5:1:1, 5:1:2, 5:1:3, 5:2:1, 5:2:2, and 5:2:3.

When the Switching Fabric initializes, one of the Switches is selected as the Principal Switch. The Principal Switch assigns the Domain IDs to all the Switches in the Fabric and its Node_Name becomes the Fabric_Name of the Switching Fabric. To select the Principal Switch, all the Switches exchange with each other a message called Exchange Fabric Parameters (EFP). The EFP contains, among other parameters, the Node_Name of the sending Switch. The Switch with the lowest Node_Name is designated as the Principal Switch. All the other Switches are referred to as non-principal Switches. Once the Principal Switch is selected, it sends to its neighbor Switches a Domain Identifier Assigned (DIA) message, which informs the neighbor Switches that it has been assigned a Domain_ID by the Principal Switch. In reply, the neighbor Switches send a Request Domain Identifier (RDI) message to the Principal Switch. The Principal Switch allocates the Domain_IDs and responds by sending each Switch its Domain_ID. Thereafter, the Switches that received a Domain_ID send a DIA to their neighbor Switches, receive an RDI in reply, and forward the RDI to the Principal Switch, which assigns the Domain_IDs to the requesting Switches. This process continues until all the Switches received a Domain_ID. After having received a Domain_ID, the individual Switches assign the Area_IDs and Port_IDs for each end device in its Domain. The Fabric configuration is considered completed when all the Switches have been assigned a Domain_ID. Consequently the end devices are all assigned their Area_IDs and Port_IDs.

Fibre Channel allows the merging of two separate Switching Fabrics into one. This happens when a connection is established between two Switches each belonging to a different Fabric. When such an event occurs, the Domain_ID of some of the Switches and the FC_ID of their end devices of the merged Fabric may need to be reassigned. For example, if a Fabric A which includes Domain_IDs one, two and three (1, 2 and 3) is to be merged with a second Fabric B which includes Domain_IDs one and two (1 and 2), then the overlapping Domain IDs (1 and 2) of one of the Fabrics must be reassigned. When two Fabrics are connected, an EFP message is exchanged across the link that connects them to determine if there is any overlap among the Domain_IDs. Depending on the outcome, one of two things may happen.

If there is any overlap of Domain_ID assignments among the Switches, the link that connects the two original Fabrics is isolated. The link is logically disconnected and is not recognized by the devices, although the physical link still remains. A SAN administrator may then request a disruptive reconfiguration of the joined Fabrics to resolve the Domain_ID conflict. In this case a ReConfigure Fabric (RCF) message is flooded across all the Switches of the two original Fabrics. This stops the delivery of all the data traffic, and each Switch revokes its Domain_ID. Thereafter, a Principal Switch is selected, new Domain_IDs are assigned to the Switches, and new FC_IDs are assigned to the end devices in the same way as described above. In this manner, the two Fabrics are merged into one.

If there is no Domain_ID overlap among the Switches, then a non-disruptive Fabric reconfiguration is automatically performed. A Build Fabric (BF) message is flooded across all the Switches of the two original Fabrics. Data frames delivery is not stopped, and each Switch keeps its Domain_ID. Since the two Fabrics each have a Principal Switch, one of the two has to "resign" from its principal status leaving only one Principal Switch for the merged Fabric. Consequently the Principal Switch selection process described above takes place. Each non-Principal Switch then makes an RDI request to the surviving Principal Switch asking for the same Domain_ID that it had before the BF message. In this way, the two Fabrics are merged without changing any Switch Domain_ID assignments or any FC_IDs assigned to the end devices.

For one of the two original Fabric, however, the Principal Switch is changed. Consequently the Fabric_Name for those Switches needs to be updated. Given that the Fabric_Name is part of the Fabric Login state information that each end device maintains, the Switches of the loosing Fabric have to re-initialize their end devices to update their status. This process causes a disruption of the data traffic in the Fabric with the losing Principal Switch.

A number of problems are associated with the way Domain_IDs are assigned among the Switches of a Fabric under the current Fibre Channel standard. Foremost, the Principal Switch is selected dynamically. In other words, the Principal Switch is selected "on the fly" when the Fabric is initially configured or whenever a change to the Fabric is implemented. Further the RCF and BF processes are disruptive to the Fabric. When the RCF process is invoked, all the traffic across the merged Fabric is halted while the Principal Switch is identified and the Domain_IDs are re-assigned. The BF process is also partially disruptive. Traffic continues in the Fabric where the original Principal Switch continues to be the Principal for the merged Fabric. With the other Fabric, however, the Switches must be updated to reflect that they are included in a new Fabric. Traffic is thus disrupted until the update is completed. Further, Fabrics with Principal Switches are prone to catastrophic problems. For example, if the Principal Switch goes down, it may render the entire Fabric inoperable. Also if a cable is mistakenly plugged into the wrong connector, inadvertently connecting together two Fabrics, it may cause the entire Fabrics to be reconfigured.

An apparatus and method for defining a static Fibre Channel Fabric that does not require a Principal Switch is therefore needed.

SUMMARY OF THE INVENTION

To achieve the foregoing, and in accordance with the purpose of the present invention, a storage area network and method for defining a static Fibre Channel Fabric that does not require a Principal Switch is disclosed. The storage area network comprises one or more hosts, one or more storage devices, and a static Fabric connecting the one or more hosts and storage devices. Within the static Fabric, the Switches have their Domain_ID and Fabric_Name manually set. The method comprises accessing the Fabric, selecting a Switch in the Fabric, and manually setting the Domain_ID and Fabric_Name for the selected Switch. The above sequence is repeated for each Switch in the static Fabric. In one embodiment, after being statically configured, the Switch is isolated from any dynamically set Switches in the Fabric. The Switch detects which of its Ports are connected to dynamically set Switches, and then isolates them, while maintaining operational the Ports connected to statically configured Switches.

DETAILED DESCRIPTION OF THE PREFERRED EMBODIMENTS

In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to unnecessarily obscure the present invention.

Figure 1:
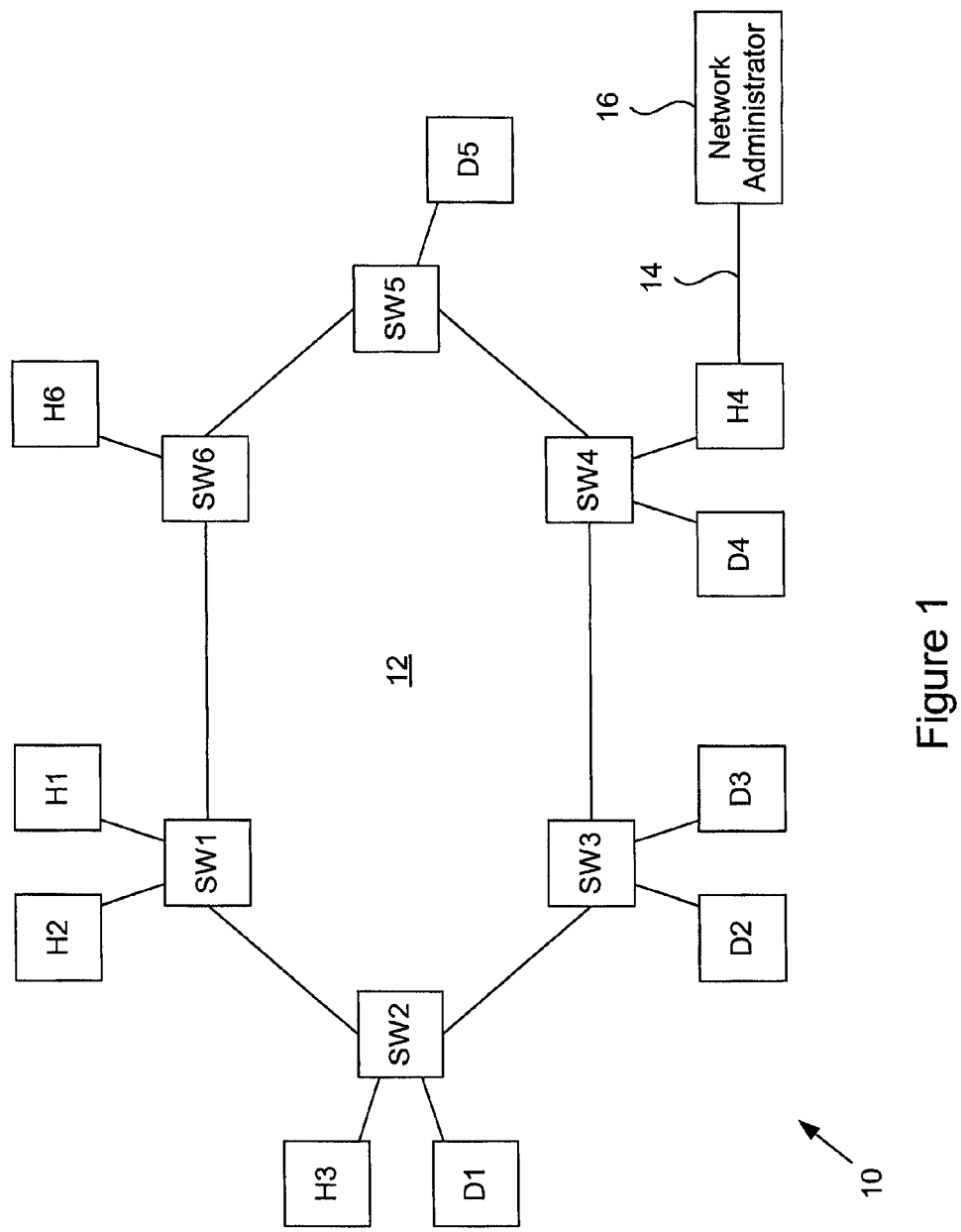
FIG. 1 is a Switching Fabric of a storage area network.

Referring to FIG. 1, a Switching Fabric of a storage area network is shown. The storage area network (SAN) 10 includes a Switching Fabric 12 that includes a plurality of Fibre Channel Switches SW1 through SW6. Also included in the SAN 10 are a plurality of hosts H1 through H6 and a plurality of storage devices D1 through D5. A tool to manage the Fabric, such as a command line interpreter or a graphic management application 14, is connected to the Fabric 12 through the host H4. The command line interpreter or management application 14 enables a network administrator 16 to manage the Fabric 12 through the host H4 and Switch SW4.

According to various embodiments of the invention, the hosts H1-H6 can be any type of host including but not limited to servers or personal computers running on either the Unix, Windows, or any other computing platform, or a combination thereof. Similarly, the storage devices D1-D5 can be any type of storage device including but not limited to tape back-up systems, emulated tape back-up systems, CD-ROM storage arrays, or one or more disks such as a Redundant Array of Independent Disks (RAID), or a combination thereof. The Switches SW1-SW6 can be any type of Fibre channel Switch such as those commercially available from Brocade of San Jose, Calif. or Andiamo Systems, the assignee of the present application. It should also be noted that the Fabric 12 as shown in the figure is merely illustrative of a SAN useful for describing the present invention. In no way should its simplicity be construed as limiting the present invention which may be used in any SAN configuration.

The present invention provides a way to manually configure the Switches SW of the Fabric 12. This technique can be used either when the Fabric 12 is initially configured or if a network administrator would like to implement a change across the Fabric 12 after it is in operation.

Figure 2:
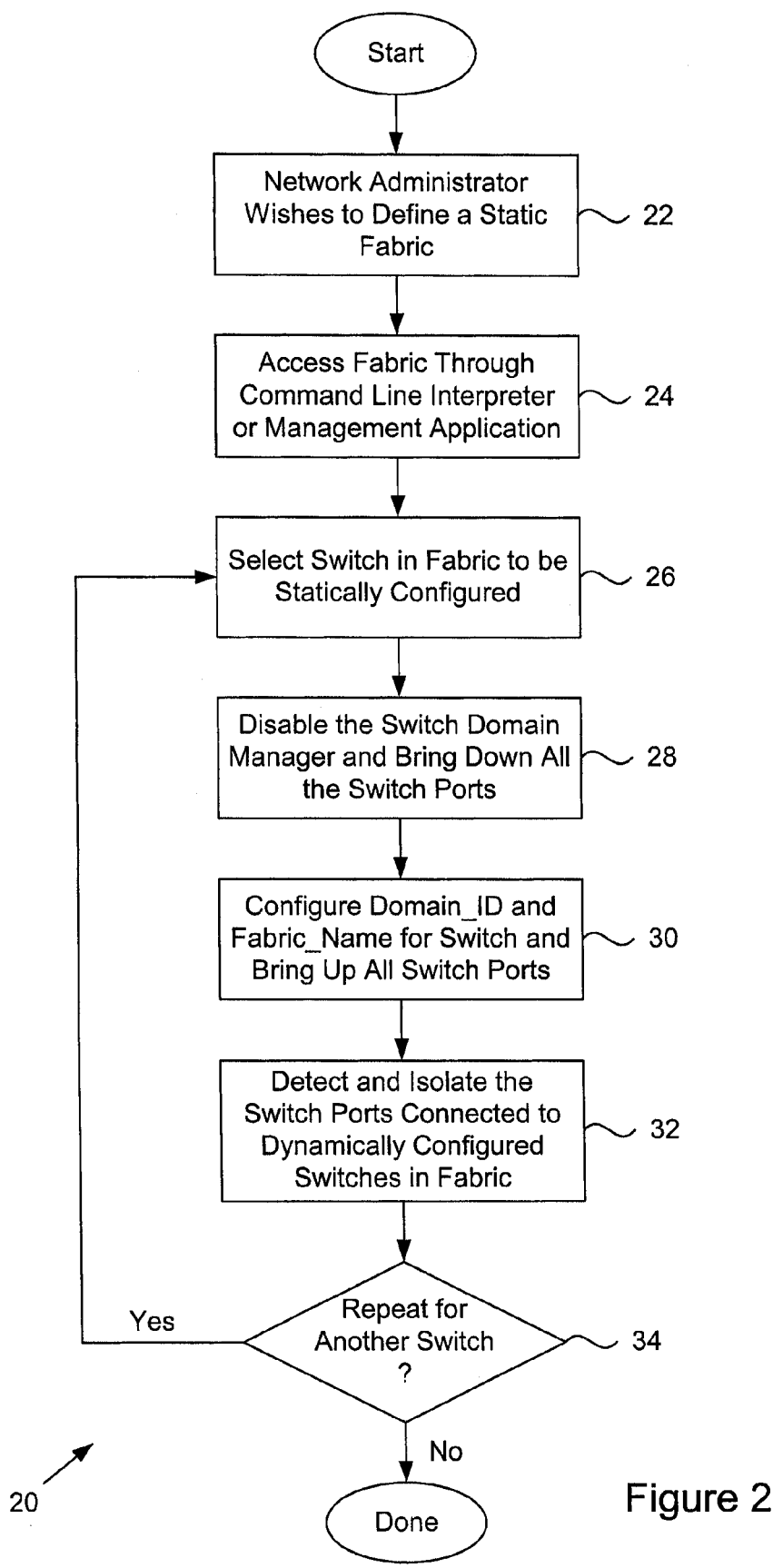
FIG. 2 is a flowchart illustrating the sequence for defining a static Fibre Channel Fabric according to the present invention.

Referring to FIG. 2, a flowchart 20 illustrating the sequence for defining a static Fibre Channel Fabric according to the present invention is shown. When a network administrator 16 wishes to statically define the Fabric 12 (Box 22), the administrator first accesses the Fabric 12. In various embodiments, this is accomplished through either the command line interpreter or management application 14 (Box 24).

Once access to the Fabric 12 is established, the administrator selects a Switch SW to be statically configured (Box 26). The domain manager (the component of the Switch that implements the Principal Switch selection and Domain_ID assignment state machine) of the Switch SW is then disabled by the administrator (Box 28). Disabling the domain manager necessitates a significant change in the working mode of the Switch. Thus when the domain manager is disabled, the Switch brings down all its Ports, including those connecting to other Switches and those connecting to the end devices. Once the domain manager is disabled, the administrator statically configures (i.e. manually writes) in the memory of the Switch an appropriate Domain_ID and Fabric_Name. After the Domain_ID and Fabric_Name are statically configured, the Switch then brings up all its Ports (Box 30). End devices connected to Ports are assigned their FC_IDs using the statically configured information using the standard Fabric_Login procedure. In an alternative embodiment, the administrator may configure the static Domain_ID and Fabric_Name before disabling the domain manager. In this situation, the Switch will not use the statically configured Domain_ID and Fabric_Name until the domain manager is disabled.

After being statically configured, the Switch is isolated from any dynamically set Switches in the Fabric 12. The Switch detects which of its Ports are connected to dynamically set Switches, and then isolates them, while maintaining operational the Ports connected to statically configured Switches. The detection algorithm is based on the Switch Ports behavior as defined by FC-SW-2. Any Port that receives a message used for a Principal Switch selection, such as EFP, BF, RCF, DIA, RDI, indicates that the Switch that sent that message was dynamically configured. The statically configured Switch in response sends a reject (SW_RJT) message to the dynamic Switch with reason code explanation "E_Port is Isolated", and then isolates that Port. On receiving this message, the dynamically configured Switch is required to isolate its Port connected to the statically configured Switch. In this manner, the manually configured Switch is logically isolated from any other Switches in the Fabric 12 that are dynamically configured. The Ports linked to any other statically configured Switches do not receive the Principal Switch selection messages (EFP, BF, RCF, DIA, RDI) and are therefore not isolated (box 32).

In decision diamond 34, the administrator decides if another Switch is to be statically configured. If not, the sequence is complete. If yes, then the administrator selects another Switch (Box 26) and the above sequence is repeated. It is responsibility of the administrator to define the same Fabric_Name and non conflicting Domain_IDs for each of the statically configured Switches.

It is useful to clarify the actions performed by the administrator versus the actions performed by the Switches. The administrator is required to disable the domain manager and write the static configuration information for each statically configured Switch. The statically configured Switches automatically performs the Port actions as described above to logically isolate the statically configured Switches from dynamically set Switches. No other action is required on the part of the administrator to statically define the Fabric 12.

The present invention thus provides a way to statically configure the Domain_ID and Fabric_Name for each Switch in the Fabric 12. Additionally, the present invention provides a method for the Switches to determine if a statically configured Switch is connected to a dynamically configured Switch or to another statically configured Switch. Furthermore, the Switches that are statically set are considered peer-to-peer equals. In other words, the present invention can be used to define a static Switching Fabric that does not require a Principal Switch.

Figure 3:
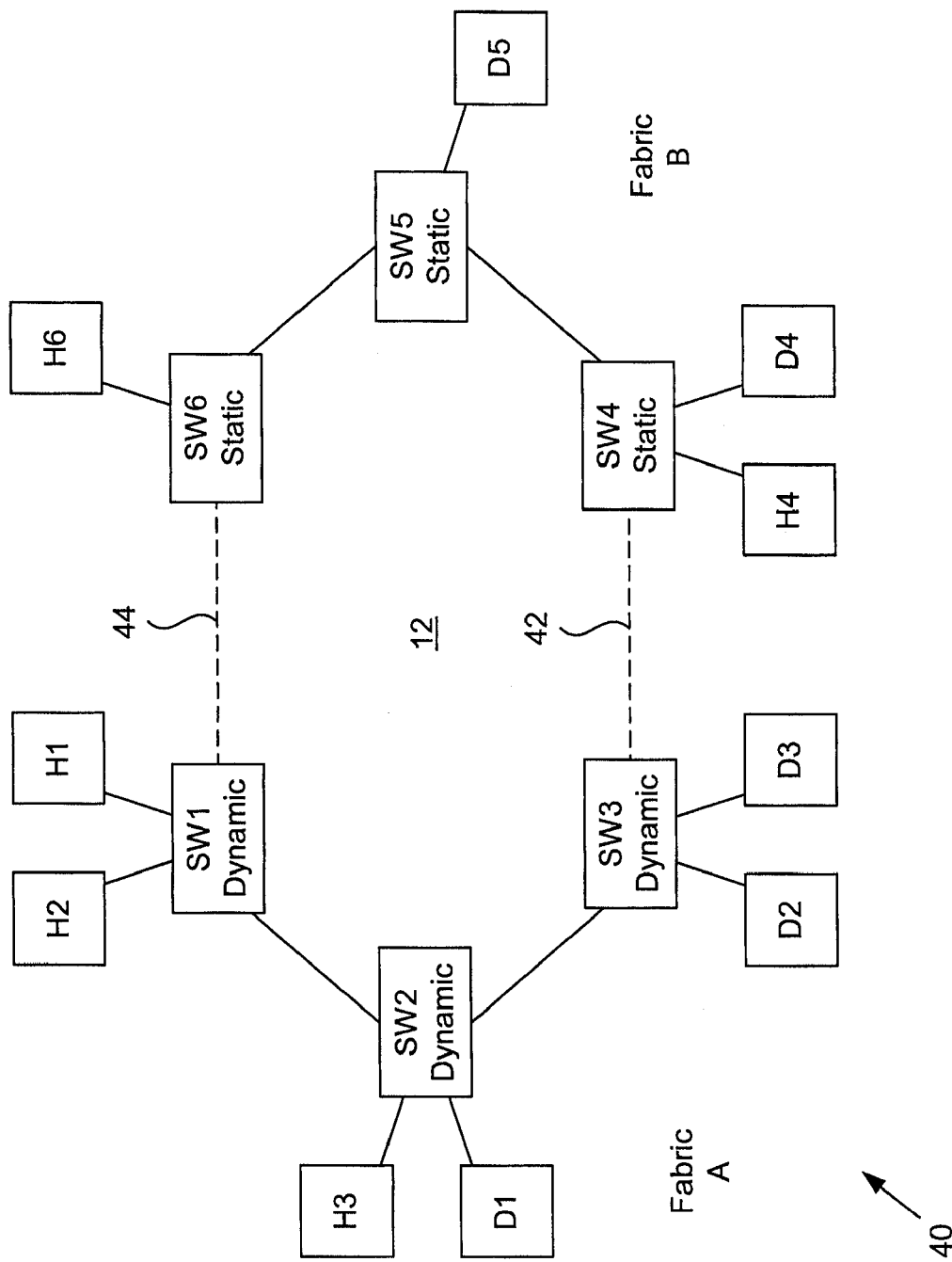
FIG. 3 illustrates an exemplary static Fibre Channel Fabric isolated from a dynamically set Fibre Channel Fabric according to the present invention.

Referring to FIG. 3, an exemplary Fabric 40 having several Switches SW that have been statically configured is shown. In this example, three of the Switches SW4, SW5 and SW6 have been statically configured as described above. The remaining Switches SW1, SW2 and SW3, however, have been dynamically configured. As described above, whenever a Switch SW is statically configured, it is logically isolated from any dynamically configured Switch SW. The dashed lines 42 and 44 are representative of the isolated links between Switches SW1 and SW6 and SW3 and SW4 respectively. It should be noted that the isolation is logical and not necessarily physical. In other words, neither data traffic nor configuration messages flow over the isolated link, except for the link initialization message (Exchange Link Parameter, ELP), which may be used to exit from the isolated state in the case that the neighboring Switch becomes a statically configured Switch. Thus, in this example, the Fabric 40 has effectively been divided into two fabrics that do not communicate with one another. Fabric A includes dynamically set Switches SW1-SW3. Fabric B includes statically set Switches SW4-SW6.

Alternatively, the present invention also enables an administrator to dynamically configure a statically configured Fabric 12. This procedures is essentially the same as that described above but in reverse. Initially the administrator is required to select a Switch and enable the domain manager of that Switch. According to one embodiment, when the above occurs the Switch brings down all of its Ports and then brings them up again in accordance with the FC-SW-2 standard. Thus the Ports behave in accordance with the FC-SW-2 standard and receive and recognize messages used for the selection of a Principal Switch, such as EFP, BF, RCF, DIA and RDI. The Switch thus becomes dynamically configured and is able to communicate with other dynamically configured Switches in the Fabric. The aforementioned process is repeated for each Switch in the Fabric that is to be dynamically configured.

The embodiments of the present invention described above are to be considered as illustrative and not restrictive. For example, the present invention does not necessarily have to be used with a SAN. Rather, it can be used by any type of network with Fibre Channel Switches that are dynamically set. The invention is not to be limited to the details given herein, but may be modified within the scope and equivalents of the appended claims.

The invention claimed is:

1. A method, comprising:
   receiving a request from a first host to access a fibre channel fabric,
   wherein the fibre channel fabric connects a plurality of hosts and a plurality of storage devices;
   transmitting to a first switch of the fibre channel fabric a message or messages from the first host comprising fabric name information and domain name information,
   wherein the first switch is statically configured using the fabric name and the domain name information, and
   wherein after being statically configured, the first switch isolates itself from a second switch included in the fibre channel fabric upon determining that the second switch was dynamically configured.

2. The method of claim 1, wherein a domain manager of the first switch is disabled either before or after the first switch is statically configured.

3. The method of claim 1, further comprising assigning fibre channel identifiers to an end device connected to the first switch after the fabric name and the domain name information are written into memory of the first switch.

4. . The method of claim 1, wherein the request to access the fibre channel fabric is sent by a user through a command line interpreter or other method of accessing the fibre channel fabric.

5. A method, comprising:
   at a statically configured first switch of a fibre channel fabric, determining that a second switch connected to the first switch was dynamically configured, the second switch included in the fibre channel fabric,
   wherein determining the second switch was dynamically configured is based at least in part on receiving a first message from the second switch;
   isolating the first switch from the second switch upon determining that the second switch was dynamically configured.

6. The method of claim 5, wherein the first message comprises a message relating to domain name or fabric name assignment.

7. The method of claim 5, further comprising:
receiving a message to enable a domain manager; and
enabling the domain manager,
wherein enabling the domain manager results in dynamic configuration of the first switch.

8. The method of claim 7, wherein after the first switch has enabled the domain manager, ports of the first switch are able to communicate with dynamically configured switches in the fibre channel fabric.

9. The method of claim 5, wherein isolating the first switch from the second switch comprises preventing data traffic or protocol units from being sent between the first switch and the second switch except at least messages relating to restoring communications between the first switch and the second switch.

10. A system, comprising:
one or more hosts;
one or more storage devices; and
a fabric connecting the one or more hosts and storage devices, the fabric having a plurality of switches being configured by a process comprising:
at the fabric, receiving a request from one of the hosts to access the fabric;
at a first switch of the fabric, receiving a message or messages from the host comprising domain name and fabric name information, the domain name and fabric name information being used to configure the first switch,
wherein after being statically configured, the first switch isolates itself from a second switch included in the fibre channel fabric upon determining that the second switch was dynamically configured.

11. The system of claim 10, wherein a domain manager of the first switch is disabled either before or after the first switch is statically configured.

12. The system of claim 10, further comprising assigning fibre channel identifiers to an end device connected to the first switch after the fabric name and the domain name information are written into memory of the first switch.

13. An apparatus, comprising:
a processor at a statically configured first switch of a fibre channel fabric operable to determine a second switch connected to the first switch was dynamically configured, the second switch included in the fibre channel fabric,
wherein the first switch is isolated from the second switch upon determining that the second switch was dynamically configured, and
wherein determining the second switch was dynamically configured is based at least in part on receiving a first message from the second switch.

14. The apparatus of claim 13, wherein the first message comprises a message relating to domain name or fabric name assignment.

15. The apparatus of claim 13, further comprising an interface operable to receive a message to enable a domain manager; and
wherein the processor is further operable to enable the domain manager,
wherein enabling the domain manager results in dynamic configuration of the first switch.

16. The apparatus of claim 13, wherein after the first switch has enabled the domain manager, ports of the first switch are able to communicate with dynamically configured switches in the fibre channel fabric.

17. The apparatus of claim 13, wherein isolating the first switch from the second switch comprises preventing data traffic or protocol units from being sent between the first switch and the second switch except at least messages relating to restoring communications between the first switch and the second switch.

18. At least one non-transitory computer readable storage medium having computer program instructions stored thereon that are arranged to perform the following operations:
receiving a request from a first host to access a fibre channel fabric,
wherein the fibre channel fabric connects a plurality of hosts and a plurality of storage devices;
transmitting to a first switch of the fibre channel fabric a message or messages from the first host comprising fabric name information and domain name information,
wherein the first switch is statically configured using the fabric name and the domain name information, and
wherein after being statically configured, the first switch isolates itself from a second switch included in the fibre channel fabric upon determining that the second switch was dynamically configured.

19. At least one non-transitory computer readable storage medium having computer program instructions stored thereon that are arranged to perform the following operations:
at a statically configured first switch of a fibre channel fabric, determining that a second switch connected to the first switch was dynamically configured, the second switch included in the fibre channel fabric,
wherein determining the second switch was dynamically configured is based at least in part on receiving a first message from the second switch;
isolating the first switch from the second switch upon determining that the second switch was dynamically configured.

* * * * *